Nov. 11, 1941.  R. H. TURK  2,262,070
METHOD OF AND APPARATUS FOR CHARGING AND SMELTING VITREOUS ENAMELS
Filed Nov. 15, 1938
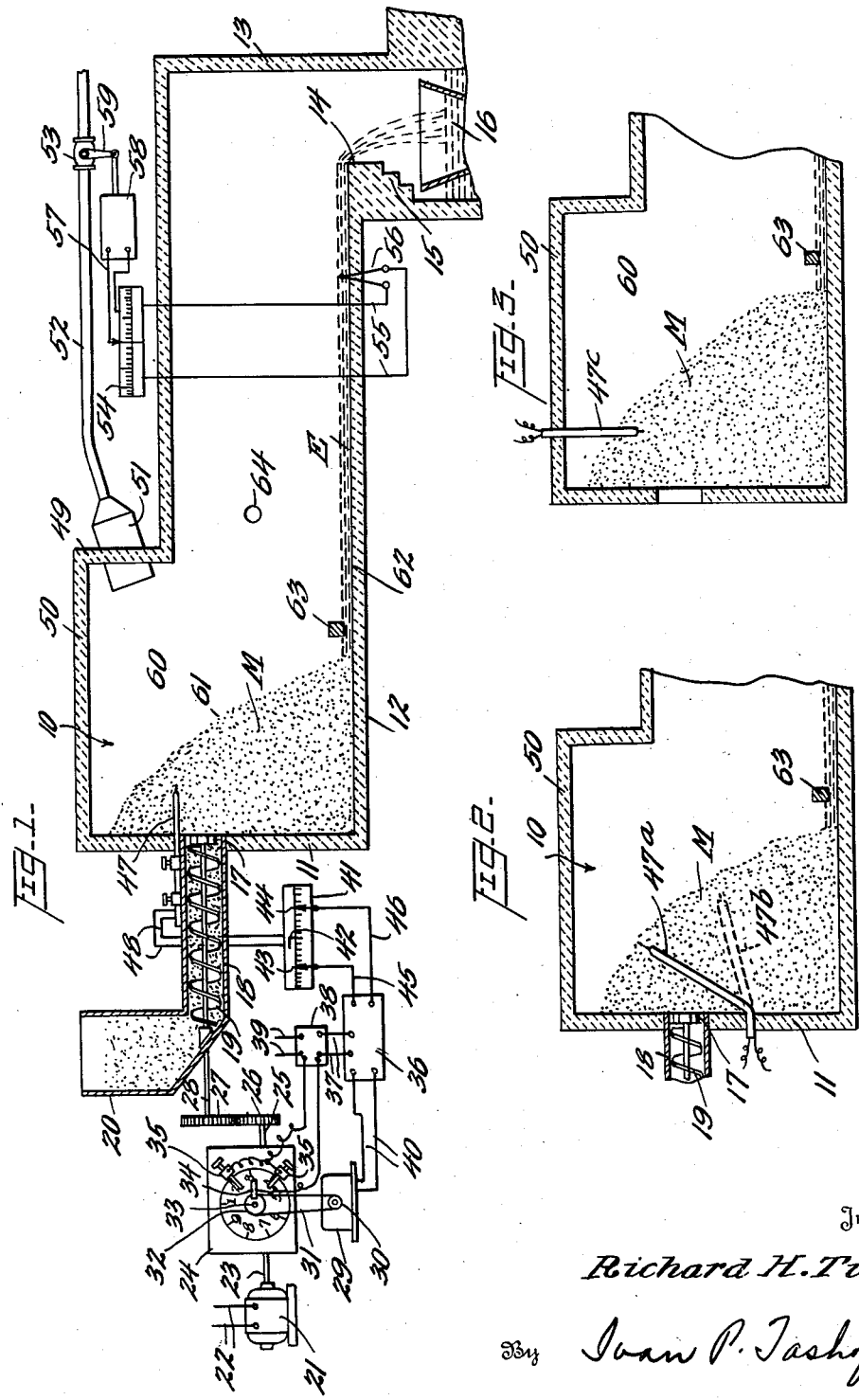
Inventor,
Richard H. Turk
By Ivan P. Tashof,
Attorney Patented Nov. 11, 1941

2,262,070

UNITED STATES PATENT OFFICE 2,262,070

METHOD OF AND APPARATUS FOR CHARGING AND SMELTING VITREOUS ENAMELS

Richard H. Turk, Baltimore, Md., assignor to The Porcelain Enamel & Manufacturing Company of Baltimore, Baltimore, Md., a corporation of Maryland Application November 15, 1938, Serial No. 240,590

7 Claims. (Cl. 49—53)

The present invention relates to the smelting of vitreous materials and while of general application, is of particular value in the smelting of vitreous enamels and glazes either in a batch type of smelter or a continuous smelter. The invention will be illustrated by describing it in connection with the continuous production of vitreous enamels and thereafter, its general applicability will be pointed out in detail.

While it is highly desirable that vitreous enamels have uniform physical and chemical properties, it has hitherto been impossible to achieve this result, this in a measure being due to the fact that vitreous materials are not smelted to a chemical equilibrium and are free of bubbles or seeds as is the case of ordinary glass. On the contrary, the constituents of the vitreous enamel charge are fused, brought to a fluid state, and then heated in the fluid state until chemical reactions between the charge constituents have proceeded to a certain definite point, whereupon the fused vitreous or porcelain enamel material is quickly quenched and comminuted to yield a material with the desired physical and chemical properties required for the vitreous and porcelain enameling of metals.

It is of importance for each kind of enamel to control the exact temperature at which the chemical interaction between the charge constituents is interrupted and the material quenched and in a continuous process of smelting enamels, it is desirable that at or near the discharge end of the fining hearth, the optimum temperature be maintained constant so that there is produced at all times an enamel having uniform chemical and physical properties.

In general, it may be stated, that if the smelting or melting of the enamel constituents be carried too far toward chemical equilibrium, the resulting material will be unsuitable for use as a porcelain enamel. If the enamel is a base-coat enamel, it will not properly cover or adhere to the metal; it will not display the proper suspension characteristics when milled for application; and upon application will not drain properly. If the over-smelted enamel be a finished or so-called "cover-coat," the enamel may lack opacity, be of poor color, be pitted, have a poor or "fuzzy" surface and have other properties making it entirely unsuitable for use.

If the smelting procedure be terminated too quickly or before the proper interaction has been affected between the charge constituents, the resulting enamel likewise will have physical and/or chemical properties making it unsuitable for use. For example, if ground-coat enamels are under-smelted, the resulting enamel will not have the proper suspension and draining properties and the resulting fined enamel may have ridges, grooves and in general, a rough surface, all of which is undesirable. Further, the under-smelting may result in a surface having pits, blisters or fish scales. Under-smelting of the cover-coat enamels may result in poor color, improper opacity, poor gloss, pits, blisters and under some circumstances, in general, a "fuzzy" surface. The term "fuzzy surface" is one used in the art to indicate that the surface lacks apparent continuity, that is, it is so broken by minute bubbles or blisters that images reflected therefrom appear distorted.

In the past, it has been the practice to melt or smelt porcelain enamel raw materials in amounts ranging from 100 to 3,000 pounds in a rotary or in a reverberatory smelter, the latter being known as a "box type" smelter. In a reverberatory furnace, the material is simply charged on the hearth of the furnace and heated until, in the opinion of the operator, the chemical interaction between the charge constituents has proceeded to the proper point, whereupon the smelted charge was tapped into a quenching bath. In this method of smelting, a part of the batch may be under-smelted, a part over-smelted, and some of the batch may be properly smelted. Further, different batches will differ in the proportion of the batch which is properly smelted, under-smelted or over-smelted. Some of the batches may consist predominantly of under-smelted material, predominantly of over-smelted material or predominantly of material which has been properly smelted. It is clear that the batch method of operation has provided a fused enamel or frit which is deficient in uniformity. Again, different batches of the enamel will differ in chemical and physical properties because of the different conditions under which the enamels have been smelted. These continuous variations of physical and chemical properties from batch to batch is obviously undesirable.

In order to eliminate the defects inherent in batch smelting, a method of continuously smelting enamel under closely controlled conditions has been proposed, said method being set forth in my co-pending application Serial Number 537,475 filed May 14, 1931 now Patent No. 2,137,930, granted November 22, 1938. In accordance with said method, the raw enamel material is charged onto an inclined smelting hearth to form a reservoir of raw enamel material, said reservoir-material being pre-heated. The exposed face of this material-reservoir is sintered and/or melted and rolls and flows down the face of the reservoir to form a stream of flowing molten enamel which flows down the face of the hearth in a relatively thin stream and is subjected as it flows to a bath of combustion gases, the latter being adequate to substantially prevent the loss of heat units from the bath by radiation or conduction. It may be pointed out that in the prior method, while the temperature of the combustion chamber was controlled, or an attempt was made to control the same, there was no attempt to control the temperature of the molten vitreous enamel as it reached the discharge point just prior to the quenching of the enamel. Therefore in the continuous process some of the enamel was subjected to quenching at one temperature and other portions of the enamel was subjected to quenching at a different temperature, this being due, to the variation in the temperature of the bath of combustion gases and the volume thereof in the fining zone and particularly at and adjacent the discharge zone. Further, the flow of the combustion gases over the enamel in the fining zone was affected by the draft on the furnace and the outside atmospheric conditions. In the method set forth in the prior application, the degree to which the enamel was over or under-smelted was greatly reduced and a far more uniform enamel or frit was produced. The above continuous method of smelting, which is admittedly a great improvement on the batch type of smelting, is in accordance with the present invention further improved to produce a fused enamel or frit having still more uniform physical and chemical properties.

In applicant's co-pending application Serial Number 240,589, filed Nov. 15, 1938, a method of continuously smelting enamel is described wherein the fluidity of the molten enamel or the like is maintained at a constant. It has been ascertained that if intermediate the inlet end of the smelter and the discharge end of the smelter, and preferably adjacent the discharge end thereof, the fining hearth is constricted, the depth of the molten vitreous enamel on the hearth is in proportion to the fluidity of the molten enamel. Since the fluidity of the liquid or molten material decreases with the decreasing temperature, if the temperature at such constricted section is maintained constant, the fluidity of the molten enamel or the like will be maintained constant, and as pointed out, the depth of the stream of the molten enamel will be constant. Of course as the fluidity of the mass increases, the viscosity of the mass decreases.

It is proposed to maintain a uniform degree of interaction between the constituents of the enamel stream, and a uniform fining action, by maintaining constant the viscosity, the depth and the temperature of the flowing stream of enamel, so that the resulting quenched vitreous material, such as porcelain enamel, will possess uniform physical and chemical properties.

It is also proposed to supply substantially all the thermal units necessary for the conversion of the raw enamel material to finished fused enamel at the face of the raw material reservoir, and allow the enamel material containing the thermal units necessary for its smelting and fining to be carried onto the smelting hearth. This is in contradistinction to the prior practice of supplying a part of the thermal units at the face of the raw material reservoir and the remainder of the thermal units by combustion gases passing over the enamel material on the smelting and/or fining hearth. When all of the thermal units necessary for smelting or fining are supplied at the face of the raw enamel reservoir, the rate of reaction between the constituents of the raw enamel charge may be closely controlled by coordinating the temperature of the enamel at the discharge end of the hearth with the temperature of the combustion chamber. Utilization of this feature allows a longer smelting action at a lower temperature, thus preventing the possible loss of volatile constituents from the enamel such as may be encountered when the enamel is allowed to flow over the hearth in a thin stream. In other words the required thermal units for the carrying on of the chemical interaction in the fining of the enamel on the fining hearth and somewhat during the smelting of the enamel on the smelting hearth, are contained in the molten stream of enamel and are not supplied from an extraneous source.

It is further proposed to maintain a stream of molten enamel of such depth that it will have sufficient thermal capacity to maintain the temperature of the stream sufficient for proper flow and reactivity, said deep stream of molten enamel being preferably maintained in the absence of the passage of combustion gases over the fining hearth, or at least a major portion thereof.

It becomes desirable in practicing the process just previously outlined to coordinate with the continuous melting, fining and pre-heat, some means to insure a constant feed and a raw material reservoir of a constant size. This is complicated by the fact that every enamel melts at a somewhat different rate, due to necessary variations in composition. The fluidity of the enamels will also be dependent upon the composition. The heat treatment required by the several different types of enamel will vary considerably. It is therefore quite possible for two enamels to be smelted at the same temperature and yet have such a difference in melting rate, fluidity and heat treatment that for best results one enamel will be produced at a rate of 600 pounds an hour while the other may be produced at 1000 pounds an hour. If the enamels, for example, are white cover-coat enamels, each will have a production rate which, at a given temperature, will give an enamel showing best working properties and maximum gloss and opacity. With ground-coat enamels adherence and physical working properties will all be affected by production rate at a given temperature. It therefore becomes necessary to obtain optimum results, to closely control not only the smelting temperature and the degree of pre-heat, but also to closely control the charging rate at the determined temperature. As previously pointed out, my co-pending application Serial Number 537,475, filed May 14, 1931 now Patent No. 2,137,930, granted November 22, 1938, contemplated the smelting of enamel by forming a reservoir of raw enamel material located at the upper end of the smelting hearth and the continuous smelting and/or sintering of the material by the application of heat against the face of the reservoir, whereby a constant stream of flowing molten enamel is continuously removed from the face of the reservoir. Since the size of the reservoir pile differs with various types of enamels it is necessary to vary the speed of charging in accordance with the desired qualities of the enamel being smelted.

In the past, it has been the practice to control the feeding of raw materials into the reservoir by manually changing the speed of the charging device through variable speed reducers. The manual control of the charging speed requires close attention of the operator, since the charging rate must be nicely balanced to the type of enamel smelted and furnace conditions. This is particularly true where an automatic device serves to control the temperature and degree of pre-heat supplied to the raw enamel reservoir in accordance with the heat at the fining zone as hereinbefore set forth. It becomes almost impossible, therefore, for the operator to correctly judge the charging speed and many times too much or too little material will be charged into the reservoir. If the enamel raw material is charged in at a speed that is greater than the melting rate, a large amount of cold raw material will be thrown into the furnace, reducing the furnace temperature, constricting the combustion space and eventually floating down over the stream of molten enamel, thus producing enamel that is insufficiently smelted.

If, on the other hand, the rate of charging be too slow, the degree of pre-heat on the face of the raw material reservoir will build up and the temperature at the face of the raw material reservoir will increase so that instead of the material rolling down the face in a sintered and semi-fused condition, the face will fuse over and the material will cease to flow uniformly. The angle of repose of the raw material reservoir will eventually exceed the normal angle, until finally, the entire face of the pile will fall down into the smelting hearth so that a large amount of unfused or non-sintered material will be blown out over the surface of the fining hearth and contaminate the enamel batch. In an extreme case this fusion may penetrate so deeply into the raw material reservoir as to fall into the screw of the charging apparatus, affecting irreparable damage.

It is the purpose of this invention to obviate the disadvantages of manual control and to substitute for the manual control of the charging rate, a close control that is entirely automatic in nature. In other words in accordance with the present invention, it is proposed to feed into a smelter, a raw enamel charge to form a raw material reservoir of a predetermined size and to constantly feed raw material to said reservoir at a rate to maintain the reservoir at a constant size during any predetermined heating of the face of the reservoir to continuously melt material therefrom.

Stated more specifically, it is the purpose of the present invention to provide a measuring device which may be pyrometric in character, in heat exchange both with the raw material reservoir and the hot gases or other heating means of the smelter, so that as the reservoir increases or decreases in size, the pyrometric means will be affected to control the speed of charging. In one form of the present invention a thermo-couple is provided which is located within the reservoir of raw material at a definite distance from the face of the raw material reservoir which is subjected to the heat of the smelter heating means, so that whenever the reservoir decreases in size the thermo-couple shall be subjected to a greater heat and whenever the raw material reservoir increases in size the thermo-couple shall be subjected to a lesser degree of heat. This action of the thermo-couple serves to control, through a suitable controlling apparatus, as for example, a speed changing device, the speed of a charging means which supplies raw material to the raw material reservoir.

In order that the present invention may be clearly understood, it will be described in connection with the following drawing in which:

Figure 1 is a schematic section showing a smelter, raw material feeding means and controls for insuring proper smelting of the raw enamel charge to produce the enamel frit.

Figure 2 is a detail showing a modified arrangement of thermo-couple used in connection with this invention.

Figure 3 is a detail showing a second modification of the thermo-couple arrangement.

In Figure 1 there is shown a smelter indicated in general at 10 and having a wall 11 at its inlet end and a floor 12. The smelter has a wall 13 at its outlet end and the floor 12 terminates in a vertical wall 14 in spaced relation to the wall 13. This vertical wall 14 is stepped back as at 15 so that a suitable receptacle 16 may be placed to catch liquid enamel flowing downwardly through the opening between the wall 13 and wall 14. In the wall 11 is an opening 17 wherein is fitted the delivery end of the casing 18 of a screw conveyor 19. At the inlet of the screw conveyor there is provided a charging bin 20.

A motor 21 is located adjacent the conveyor 19 and receives current from a suitable source through the leads 22. This motor has a shaft 23 which connects to a variable speed reducing device, indicated in general at 24. The details of construction of this device are not deemed necessary to be here shown, as such devices are well known. The shaft 23 forms a driving shaft for the speed changing device and from the device extends a driven shaft 25 which carries a gear 26 meshing with a gear 27 fixed on the shaft 28 of the screw conveyor 19. By this means the speed of the screw conveyor 19 may be varied. At 29 is a reversible motor, on the shaft of which is mounted a sprocket 30 connected by a chain 31 with a sprocket 32 on the shaft 33 of the variable speed reducer 24. Revolution of the shaft 33 controls the action of the speed reducer 24 for changing the ratio of speeds between the shafts 23 and 25. Since the shaft 23 operates at a constant speed, the action of the shaft 33 in effect controls the speed of the shaft 25 and, through the gears 26 and 27, the speed of the shaft 28. On the shaft 33 is fixed a contact 34 and the speed reducer is provided with a pair of adjustable contacts 35 between which the contact 34 may move. 36 indicates a reversing switch which is connected by conductors 37 with a limit switch 38 in turn connected through conductors 39 to a suitable source of current. The reversing switch and the limit switch which are of a conventional type need not be described in detail here. Suffice it to say, however, that the reversing switch serves to reverse the current supplied to motor 29 through conductors 40 while the limit switch serves to break the supply circuit to the motor 29 in one position while at the same time establishing a circuit to the reversing switch 36 which will be operative when the reversing switch is moved to the other position to reverse the current to the motor. At 41 is a pyrometer having a needle 42 mounted to move between the adjustable temperature controls 43 and 44. The control 43 of the pyrometer is connected through conductor 45 with the switch 36, while the control 44 is connected through conductor 46 with the switch. It is to be noted that the conductors 45 and 46 are merely intended as diagrammatic representations of the connection between the controls 43 and 44 of the pyrometer and the reversing switch 36. In an actual device, pairs of conductors 45 and 46 connect switches on the pyrometer with the reversing switch. These switches are adapted to be tripped by the needle 42 so that no current actually passes through the needle of the pyrometer. However, any conventional pyrometer control may be used to control either directly or indirectly by means of relays, the reversing switch 36 which is capable of reversing the current to the motor 29. Extending through the wall 11 above the inlet for the raw material and suitably connected to the inlet as by a bayonet joint or other adjustable connection therewith, is a thermo-couple 47 connected by conductors 48 with the pyrometer 41.

The furnace 12 has a vertical wall 49 extending downwardly from its top 50 in spaced relation to the wall 11 and through the wall 49 extends a burner 51 provided with fuel, such as gas, through a pipe 52 controlled by a valve 53. At 54 is a pyrometer which is connected by conductors 55 with a thermo-couple 56 extending through the bottom 12 of the furnace in such position that molten enamel flowing along the bottom of the furnace will flow over the thermo-couple. The pyrometer is connected by conductors 57 with electro-magnetic means 58 for actuating the operating handle or lever 59 of the valve 53.

Burner 51 introduces combustion gases into the combustion chamber of the smelter indicated in general at 60. These combustion gases are in direct contact with the exposed face 61 of the raw material reservoir M. The raw material reservoir is fed as heretofore pointed out, by the screw 19 and the exposed face thereof is allowed to form at its normal angle of repose. While this face may be considered, for the purposes of illustration, as a single face, it is desired to point out that the contours of said face are the result of natural forces acting on the face of the reservoir pile as the melting and charging operations continue. Thus, the face may not be continuous in any given direction, but may change continuously as the melting and charging operation proceeds. For example, the contour of face 61 may at one time take the form of a segment of a cone and another time it may take the form of an inclined plane or it may roughly approximate a portion of a pyramid. The combustion gases impinging on the face 61 of the reservoir preferably not only partially fuse and/or sinter the material present on the face, but also function to pre-heat the raw enamel material present in the reservoir so that by the time the enamel material reaches the face 61 it is almost at the fusion temperature and rapidly sinters and/or partially fuses upon reaching the reservoir face. The sintered and partially fused raw enamel material falls and slides down the face 61 and forms a stream of molten enamel E, which passes along the hearth indicated in general at 62. As specifically pointed out in my co-pending application Serial Number 240,589, the hearth is divided into a melting zone and a fining zone. The hearth is also provided with a floating bridge wall 63 and a constricted portion at the outlet end thereof in order to maintain a relatively deep bath of material for the purpose of securing a uniform degree of interaction between the constituents of the enamel stream and a uniform fining action, this action being promoted by the regulation of the fuel supply in accordance with the temperature of the enamel stream as measured by thermo-couple 56.

In the operation of the device, it is first necessary to determine the approximate speed desirable for charging the particular enamel which is to be fused. This, of course, will depend on the character and composition of the type of enamel being smelted. The desired charging speed having been ascertained, the contacts 35 are adjusted to such a position that the action of the apparatus will maintain a constant supply within limits of the raw enamel material being charged to the reservoir M by means of the screw 19. The upper and lower temperature controls 43 and 44 of the thermocouple are next set at the pre-determined temperature limit for the position of the thermo-couple 47 in the mound M of the raw material. The charge device is then started by closing the circuit of the motor 21 preferably with the contact 34 midway between the limiting contacts 35. By this means the screw 19 is driven and the raw material is fed into the raw material reservoir M. As previously pointed out, the hot combustion gases from the burner 51 will melt a portion of the surface 61 of the reservoir M and produce an enamel stream on the smelter hearth which is quenched in the receptacle 16. If the melting or removal of material from the mount of raw material reservoir M is too rapid, the thermo-couple 47 will have a portion of the material covering it melting away at a faster rate than it can be replaced by the conveyor 19. This will cause the thermocouple to heat up beyond the desired limit of temperature and the pointer 42 of the pyrometer will close a circuit through contact 44 to the reversing switch 36. The switch 36 in turn will close a circuit to the motor 29 causing the motor to drive the speed changer 24 through chain drive 31. This action will increase the speed of the drive from the motor 21 to the conveyor and cause material to be charged to the raw material reservoir M at a faster rate whereby to compensate for the uncovering of the thermo-couple 47.

If, on the contrary, the raw material is fed too rapidly there will be an increase in thickness of the raw material layer of the thermo-couple 47 which will result in the thermo-couple cooling to some extent. This will cause the pointer 42 of the pyrometer to contact the adjustable temperature control 43, closing a circuit of the reversing switch 36 and actuating the switch 36 to reverse the current supplied through conductors 40 to motor 29. This will cause the motor to run in an opposite direction to drive the speed reducer 24 in an opposite direction. The speed reducer in turn will therefore cause the conveyor 19 to slow up and the feed of raw material to the reservoir M will be correspondingly lessened.

The purpose of the adjustable contacts 35 is to limit the upper and lower speeds of the conveyor. As may be understood, it would be undesirable in many instances to raise or lower the conveyor charging rate to too great a degree. The adjustable contacts 35 are therefore pre-set to limit the slowest and fastest charging rate of the conveyor 19. When the motor 29 is actuated to increase the charging rate and the higher charging rate is reached, movable contact 34 will close a circuit through one of the contacts 35 to the limit switch 38 actuating the limit switch and causing the circuit from the power supply 39 to the reversing switch 36 to be broken while at the same time closing another circuit in the limit switch 38 which will supply a current to the reversing switch 36 when the reversing switch is moved to reverse the current to the motor 29. This will stop the motor 29 and prevent the speed of the conveyor from being increased beyond the desired upper limit. When, on the other hand, the motor 29 is running in a direction to decrease the speed of the conveyor and the desired lower limit is reached, the contact 34 will close a circuit through the other of the contacts 35 and the limit switch 38 will be again actuated to break the circuit through the reversing switch to the motor 29. It is understood, of course, that these contacts 34, 35 may be omitted and the speed adjustment of the conveyor varied under the direct control of the thermo-couple 47 without any upper or lower limits of speed being set. It is highly desirable, however, in order to promote a smooth operation of the smelter feeding device, to set certain upper or lower limits for the charging rate. These limits obviously will be varied for different types of enamel.

In the form of the invention shown in Figure 2, the parts disclosed are identical with those of Figure 1, except that instead of a thermo-couple 47 attached to the conveyor as by a bayonet joint, there is employed a thermo-couple 47a which is independently projected through the wall 11 of the furnace. This thermo-couple 47a may be disposed angularly upward as shown in full lines, or may be disposed in a direction shown in dotted lines and indicated at 47b.

In the form of the invention shown in Figure 3, the smelter is shown as having the thermo-couple 47c extending downwardly through the top wall 50 of the smelter combustion chamber. The thermo-couple 47c is therefore exposed in part as at its midsection to the action of the hot gases in the combustion chamber 60. The tip of the thermo-couple 47c is exposed to a greater or lesser degree to the temperature in the raw material reservoir M. It is evident, therefore, that as the raw material reservoir increases in size, a greater portion of the thermo-couple 47c is protected from the action of the heat gases in combustion chamber 60 and as the size of the raw material reservoir shrinks a greater portion of the thermo-couple 47c is exposed to the action of the hot gases. The action upon the thermo-couple in response to shrinkage of the raw material reservoir will therefore be somewhat similar to the action on the thermo-couple 47 and 47a.

In each of the modifications described it is understood that the controlling action of the thermo-couple is similar to that described with relation to Figure 1 and that the same temperature control is provided to control the temperature of the melted enamel stream. However, in the modification disclosed in Figure 3 a higher controlling temperature is used since necessarily a portion at least of the thermo-couple is exposed to the combustion temperatures of the furnace and the pyrometer adjustable switches 43 and 44 must be set for the correspondingly higher limiting temperatures.

In the place of changing the speed of charging at upper or lower temperature limits the variations in charging speed may be eliminated entirely and the charger either shut off entirely when the upper temperature limit is reached or operated at a constant speed when the lower temperature limit is reached. This constant speed may be either the full speed of the charger or if desirable, some lower speed, depending upon the fusing rate of the material in question.

It is also desired to point out that the closer the point of the thermo-couple 47 is to the exposed surface or outer face 61 of the raw material reservoir, the more delicate will be the control. However, since the contours of the exposed surface of the raw material reservoir is continuously changing as melting proceeds, as previously pointed out, if the thermo-couple is located too close to the surface erroneous results may ensue. Thus, the location of the point of the thermo-couple must be so determined as to give the greatest uniformity of results together with the maximum sensitivity. In the place of a thermo-couple located in the raw material pile, some other controlling means may be used, although a thermo-couple arranged in the manner hereinbefore described is preferred. An example of another means for regulating the speed of charging by the size of the raw material reservoir is a photo-electric cell so placed that a beam of light thereto will be blocked out if the size of the reservoir increases beyond a certain limit. This means of regulating the size of the raw material reservoir is not as flexible, however, as the pyrometer control hereinbefore described. In practicing the present invention the smelter combustion gases are preferably exhausted through the port 64 in the side wall of the furnace to thereby substantially prevent their passage over the major portion of the flowing stream of enamel present on the fining hearth. Instead of exhausting all of the combustion gases, merely a portion thereof may be exhausted and the remaining portion allowed to contact the flowing enamel to bring up the heat content of the enamel when this is necessary. Usually the use of merely a portion of the gases will not be necessary and the fining may be effected in the substantial absence of combustion gases, but for certain specific cases it can be used as will be more fully pointed out later on. The charging control of the present invention may be used irrespective of whether the fining is carried out in the substantial absence of combustion gases, in the presence of combustion gases, or in the presence of merely a portion of the combustion gases.

The present charging control, although described and particularly adapted for use with the smelter of the type hereinbefore described, is suitable for controlling the charging in any process where a constant size raw material reservoir is desirable. It is desired to point out, however, that the present invention is particularly adapted for use in instances where a raw material reservoir is being continuously augmented as it is melted or shrinks in size.

The charging control, in accordance with the present invention, is particularly adapted for use with the "deep bath" smelter as particularly described in my co-pending application Serial Number 240,589. It is proposed, preferably in accordance therewith, to melt, smelt and fine the enamel on a flat hearth having present a deep bath while at the same time maintaining a uniform degree of interaction between the constituents of the enamel stream, and a uniform fining action, said interaction and fining action being effected by maintaining constant the viscosity and temperature of the flowing enamel at and adjacent the constricted portion hereinbefore described. In the prior continuous smelter Patent No. 2,137,930 the enamel is smelted on an inclined hearth, and the depth of the enamel stream is on the order of 1½ to 2 inches or less. This depth of stream does not carry sufficient thermal units to maintain the heat of the stream, such a stream is not considered a deep stream. Any stream having a depth conferring upon the stream sufficient thermal capacity to maintain the temperature of the stream at a point sufficient for proper flow and reactivity while substantially inhibiting flash surface oversmelting, may be considered a "deep stream." Using a flat hearth, a stream having a depth of between 2 to 2½ to 6 or 7 inches comes within the latter definition and may be considered a "deep bath."

According to the prior art methods, the enamel was passed over the hearth of the smelter in a thin stream, that is a stream approximating 1½ to 2 inches in depth. Due to the fact that this thin stream, heated to a given temperature did not carry sufficient thermal units to effect the desired fining, it was necessary to bathe the surface of the thin bath of vitreous enamel with a blanket of combustion gases in order to conserve the heat energy present in the bath; that is to prevent said heat energy from being dissipated by radiation to the crown and walls of the furnace or by direct conduction to the hearth of the furnace. Since in the prior methods the combustion gases were obviously maintained at a higher temperature than the stream of vitreous molten enamel, it was not possible in actual practice, to control the ratio between the heat carried by the combustion gases and the heat carried by the molten enamel and to simply replace or prevent any loss of heat by the molten enamel itself. In actual practice it was necessary to prevent the molten enamel from cooling down, and as a matter of fact, the surface layer of the molten enamel was actually heated so that its temperature was materially increased and as a result, this enamel, in many cases, was slightly oversmelted. In practicing the present invention in its preferred form, it is possible by utilizing the deep bath to eliminate entirely the necessity for bathing the molten stream with combustion gases since the molten vitreous enamels contain adequate latent heat to allow for any radiation losses while at the same time containing sufficient heat within the molten stream to properly carry out the fining step. The term "deep bath" distinguishes from the term "shallow bath" which has been used up to the present time in the continuous smelting of vitreous enamels and the term "deep bath" may be defined as a bath having a depth such that the molten enamel contains adequate latent heat to allow for the proper fining of the enamel without imparting to the enamel additional heat units from any extraneous source. However, it is to be understood that some departure from the above figures is permissible and both will still come within the spirit of the present invention. In order to allow for some variation the depth of the bath has been defined in a functional manner.

The deep stream permits the streams to carry sufficient thermal units to provide for interaction between the charge components and thereby eliminates the necessity of bathing the flowing stream in combustion gases. With the substantial presence of combustion gases eliminated, there is little flash surface over-smelting. Even with combustion gases eliminated, there is some opportunity for flash surface over-smelting, but this is inhibited or minimized by having a deep bath, as for example, 2 to 2½ to 6 or 7 inches. By "flash surface over-smelting" is means the tendency of the enamel on the surface of the flowing stream to be "over-fined." The use of a deep bath on a flat hearth makes the bath more susceptible to accurate temperature and viscosity control. The deep bath also enables a maximum opacity to be easily attained. Utilizing a flat hearth, and a deep bath in the absence of combustion gases, the rate of reaction between the constituents of the raw enamel charge may be closely regulated or controlled by coordinating the temperature of the enamel at and adjacent the constricted zone and/or discharge zone of the bath with the temperature of the combustion chamber, the temperature at the constricted or discharge zone being held substantially constant.

While the invention may also be practiced in a smelter in which no constricted zone is used, it is preferred to use a constricted zone.

In the following examples there are illustratively set forth typical ground-coat, opaque or cover-coat enamels and clear enamels which may be smelted in accordance with the present invention.

Table I

| Raw material | 1 Ground or base coat enamel | 2 Opaque or cover coat enamel | 3 Clear enamel |
|---|---|---|---|
| | Per cent | Per cent | Per cent |
| Flint | 29.0 | 21.7 | 30 |
| Feldspar | 22.0 | 19.3 | 24 |
| Borax | 30.0 | 27.6 | 29 |
| Soda ash | 5.0 | 4.1 | 10 |
| Soda niter | 4.6 | 2.7 | 3 |
| Fluorspar | 6.0 | 6.2 | |
| Cobalt—sesquioxide | 0.4 | | |
| Manganese dioxide | 2.0 | | |
| Nickel oxide | 1.0 | | |
| Zinc oxide | | 4.8 | |
| Cryolite | | 9.5 | 4.0 |
| Antimony oxide | | 4.1 | |

Referring to the ground-coat enamel set forth in the above table, the enamel is smelted with a combustion zone temperature of 2150° F. and a discharge temperature of about 2050° F. The enamel bath has a depth of about 3½ inches.

Referring to the cover-coat enamel set forth in column 2, the enamel is smelted at a combustion temperature of 2050° F. and a discharge temperature adjacent the constricted zone of about 1850° F., the depth of the enamel bath being from 3 to 3½ inches.

Referring to column 3 of the above table, there is set forth a clear enamel, that is an enamel in which no opacifying material is present, the finished frit in its finished state being substantially transparent. This enamel may be smelted at a combustion temperature of 2150° F. and the discharge temperature at or adjacent the constricted zone is 2000° F. The depth of the enamel bath is 1½ to 2 inches. In producing a clear transparent vitreous enamel it is desirable to heat the enamel to a high temperature in order to make substantially certain that any ingredients producing opacity such as fluorine are removed from the glass. The clear vitreous enamel cannot be smelted with a deep layer, as for example, 2½ to 3½ inches, because the use of a deep layer tends to keep the opacifying agents in the enamel. Therefore, since it is necessary in producing a clear vitreous enamel to use a thin layer, it is in many cases impossible to impart to the molten stream of clear enamel the thermal units necessary to melt and to effect the desired fining by the interaction of the charge components. In such a case, a portion of the combustion gases may be passed over the fining bath to impart to the bath of clear enamel which is being fined, a portion of the thermal units necessary to effect the desired fining and interaction of the charge components. This step of splitting the combustion gases may be used with or without a constricted zone or with and without a constricted zone and/or a temperature control at and adjacent the constricted zone as hereinbefore pointed out. There may be other enamels which it is necessary to smelt at a high temperature and in a thin layer and for such enamels the step of splitting the combustion gases may be utilized. The operator skilled in the art can easily determine the amount of the gases which it is necessary to pass over the clear enamel bath or the like.

In general the depth of the bath, combustion temperature and discharge temperature for ground-coat, cover-coat and clear transparent frits are set forth in the following table.

Table II

|  | 1 Ground coat | 2 Cover coat | 3 Clear |
| --- | --- | --- | --- |
| Depth of bath_____inches__ | 3½ | 2½ to 7 | 1¼ to 2 |
| Combustion temperature____° F__ | 2100±150 | 2000±150 | 2100±150 |
| Discharge temperature_____° F__ | 2050±150 | 1900±150 | 2050±150 |

While by far the best results are obtained by smelting and fining on a flat hearth, the present invention in all its variations, as above set forth, may be practiced on a hearth having a slight inclination varying from about 1 inch to 15 feet of hearth to 4 inches in 15 feet of hearth. The outstanding advantage of the use of a flat hearth is that the flow of the enamel along and over the hearth may be better controlled.

The present invention is applicable to sheet iron enamels, cast iron enamels, ground-coats, cover-coat enamels and glazes. It may also be used to produce clear enamels, and acid-resisting enamels.

The present invention enables the continuous production of vitreous or porcelain enamels, having uniform properties that is to say, that samples tapped at any time during the continuous run will exhibit substantially the same solubility in water during and after milling; hardness; brittleness; friability; thermal properties when applied to a metal base as for example, iron; adherence; and opacity.

While the present invention has been illustrated in a method employing a liquid or gaseous fuel as the heating medium, it is desired to point out that the charge may be preheated and/or melted and/or fined by thermal units electrically generated.

It is desired to point out that in the preferred form of the invention only a relatively small portion of the fining hearth is constricted, as for example one-fifth of the length of the fining hearth, such constriction occurring at or near the discharge end. However, it is recognized that the amount of the fining hearth that is constricted may be increased or decreased and still come within the spirit of the present invention. In other words, the fining portion is carried out in accordance with the present invention preferably on a hearth the major portion of which is unconstricted and the minor portion constricted, said constriction being at or adjacent the discharge end of the hearth.

It is thought to be broadly novel to continuously fine vitreous enamel and particularly porcelain enamel by imparting to the stream of enamel at the initiation of its flow all of the thermal units necessary to effect during fining the desired interaction between the stream constituents, and this irrespective of whether the fining is carried out on a flat hearth or on an inclined hearth, or on a constricted hearth, or with the temperature of the fining bath at any intermediate position or adjacent the discharge end maintained at a constant optimum temperature.

While the invention has been described in connection with the continuous production of vitreous enamels, the invention may be used in the production of vitreous glazes, ceramic glazes, glass and other vitreous materials.

The present invention may be employed in smelting vitreous materials in the batch type of smelting operation by forming within the smelting furnace a reservoir of raw material and adding the charge components thereto in a manner similar to that set forth in the continuous smelting operation, at the same time maintaining the size of the material-reservoir substantially constant by means of the present invention during the charging operation, thus maintaining a uniform addition of molten material to form the final bath within the furnace. This is in contradistinction between the present method wherein the entire bath is charged into the smelting furnace simultaneously and subjected to heat so that the more volatile or more fusible elements separate from the body of the raw-material charge more rapidly than the more refractory or less volatile constituents and thereby produce a non-homogeneous body of molten material. By using the present invention to charge the intermittent type smelter, it is possible to eliminate to a large extent the separation of the more highly volatile and more fusible materials from the less refractory or less volatile materials and thereby increase the uniformity of the resultant body of molten material. After the charge has been melted the material may be allowed to fine in the smelter and then tapped off and the process continued.

The present invention in its broadest form, is applicable to the production of ordinary glass which usually is produced by fusing soda, lime and silica, but which may contain small quantities of other ingredients.

The basic feature of the present invention is directed to varying the rate of feed of the material in accordance with the temperature at a pre-determined point in the material reservoir, the rate of feed to the latter being increased when the size of the reservoir decreases and, decreased when the size of the reservoir increases. This step may be combined with any or all of the other steps herein set forth, this basic feature in combination with all or some of the other steps herein set forth representing the preferred methods of effecting a smelting of vitreous-forming materials of the character described and their equivalents, all of which are well known in the art. More specifically, it is to be understood that while the basic feature of the present invention as above set forth may be applied to vitreous enamels, metal glazes and ceramic glazes, it is equally applicable to the smelting of all kinds of materials adapted to form vitreous compounds or compositions.

What is claimed is:

1. The method of smelting vitreous-forming materials comprising feeding into a smelter a raw-material charge to form therefrom a raw-material reservoir of a predetermined size within said smelter, heating a face of said reservoir to continuously melt material therefrom, and varying the rate of feed of the material to the reservoir in accordance with temperature changes at a pre-determined point within said reservoir so as to increase the rate of feed to the reservoir when the size of the reservoir decreases and decrease the rate of feed when the size increases.

2. The method of smelting vitreous-forming materials comprising feeding into a smelter a raw-material charge to form therefrom a raw-material reservoir of a pre-determined size within said smelter, heating a face of said reservoir to melt material therefrom, and varying the rate of feed of material fed to the reservoir in accordance with temperature changes at a pre-determined zone within the reservoir and spaced from the heated face of said reservoir so as to increase the rate of feed when the size of the reservoir decreases and the face of the reservoir approaches the pre-determined zone and decrease the rate of feed when the size of the reservoir increases and the face retreats from said pre-determined zone.

3. The method of continuously melting and fining vitreous materials in a smelter having a melting zone and fining hearth zone, said materials being selected from the group consisting of vitreous enamels and glazes, comprising feeding raw material to said smelter to form a reservoir of raw material of a predetermined size within said smelter, heating a face of said reservoir by exposure to products of combustion, the latter functioning to heat the raw material and the surface area thereof to melt and displace material from said face and reservoir whereupon a flowing stream of enamel or glaze is formed, said products of combustion imparting to the charge the thermal units necessary to effect melting and desired interaction of the stream constituents during fining, and varying the rate of feed of material in accordance with temperature changes at a predetermined zone within the reservoir and spaced from the heated face of said reservoir so as to increase the rate of feed when the size of the reservoir decreases and the face of the reservoir approaches the predetermined zone and decrease the rate of feed when the size of the reservoir increases and the face retreats from said predetermined zone.

4. In an apparatus for the smelting of vitreous materials including a smelting chamber, means to feed raw material to said smelting chamber to produce a raw material reservoir having an inclined fusible surface, said reservoir normally covering a portion of said smelting chamber, means to heat a portion of said fusible surface to melt and displace material from said surface and reservoir; and means for controlling the amount of material in said reservoir including a heat-sensitive element extending in part at least, into the reservoir portion of said smelting chamber said element thereby being positioned to be imbedded at least in part in said raw material and at least partially shielded from the heat in that portion of the smelter outside the raw material reservoir by said raw material, and means for controlling the rate of feed of said feed means connected to said element whereby the speed of said feed means is responsive to the temperature of said heat-sensitive element.

5. In an apparatus for the smelting of vitreous materials including a smelting chamber, means to feed raw material to said chamber to produce a raw material reservoir having an inclined fusible surface and normally covering a portion of said smelting chamber, means to heat a portion of said surface to melt and displace material from said surface and reservoir, and means for controlling the amount of material in said reservoir including a heat-sensitive element, extending in part at least, into the reservoir portion of said smelting chamber said element thereby being positioned to be imbedded at least in part in said raw material and at least partially shielded from the heat in that portion of the smelter outside the raw material reservoir by said raw material, variable speed means for driving the feed means and varying the rate of feed of raw material by said feeding means and means to connect said variable speed means and said heat sensitive element.

6. In an apparatus for the smelting of vitreous materials including a smelting chamber, means to feed raw material to said chamber to produce a raw material reservoir having an inclined fusible surface and normally covering a portion of said smelting chamber, means to heat a portion of said surface to melt and displace material from said surface and reservoir; and means for controlling the amount of material in said reservoir including a heat-sensitive element, extending in part at least into the reservoir portion of said smelting chamber said element thereby being positioned to be imbedded at least in part in said raw material and at least partially shielded from the heat in that portion of the smelter outside the raw material reservoir by said raw material, variable speed means for driving the feed means and varying the rate of feed of raw material by said feeding means, means to connect said variable speed means and said heat sensitive element, and limiting means for said variable speed means to limit the change of driving speed of the feed means.

7. In an apparatus for the melting of vitreous materials including a smelting chamber adapted to contain a raw material reservoir, a feeding means extending through a rear wall of said smelting chamber to feed said raw material to said chamber to produce said raw material reservoir, said reservoir having an inclined fusible surface and normally covering a substantial portion of said smelting chamber, means to heat a portion of said fusible surface to melt and displace material from said surface and reservoir, a motor for operating said feeding means; and controlling means for said feed means including a speed changing means for driving said feeding means at a plurality of speeds from said motor, a second motor connnected to said speed changing means, means for starting, stopping and reversing the movement of said last mentioned motor to correspondingly vary the action of the speed changing means, a thermocouple extending into said raw material reservoir and through a wall of said smelter adjacent said feeding means, and connecting means between said thermocouple and said starting, stopping and reversing means so as to operate said second mentioned motor in response to the temperature of the portion of said reservoir adjacent said thermocouple whereby the addition of raw material to said reservoir is effected in accordance with the amount of material fused therefrom.

RICHARD H. TURK.